United States Patent
Chandoor et al.

(10) Patent No.: US 10,911,456 B2
(45) Date of Patent: *Feb. 2, 2021

(54) SYSTEMS AND METHODS FOR DEVICE PUSH PROVISIONING

(71) Applicant: Visa International Service Association, San Francisco, CA (US)

(72) Inventors: Madhuri Chandoor, San Jose, CA (US); Jalpesh Chitalia, Castro Valley, CA (US); Gueorgui Petkov, Pleasanton, CA (US); Mohamed Nosseir, Castro Valley, CA (US); Parveen Bansal, San Ramon, CA (US); Thomas Bellenger, San Mateo, CA (US); Simon Law, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,377

(22) Filed: Feb. 5, 2019

(65) Prior Publication Data
US 2019/0173883 A1    Jun. 6, 2019

Related U.S. Application Data

(63) Continuation of application No. 15/402,095, filed on Jan. 9, 2017, now Pat. No. 10,243,958.
(Continued)

(51) Int. Cl.
*H04W 12/04* (2009.01)
*H04L 29/06* (2006.01)
(Continued)

(52) U.S. Cl.
CPC .......... *H04L 63/10* (2013.01); *H04L 63/0853* (2013.01); *H04L 63/108* (2013.01);
(Continued)

(58) Field of Classification Search
CPC ... H04L 63/10; H04L 63/0853; H04L 63/083; H04L 63/108; H04L 2436/121
See application file for complete search history.

(56) References Cited

U.S. PATENT DOCUMENTS

| | | |
|---|---|---|
| 5,613,012 A | 3/1997 | Hoffman |
| 5,781,438 A | 7/1998 | Lee |

(Continued)

FOREIGN PATENT DOCUMENTS

| | | |
|---|---|---|
| CN | 102792325 | 11/2012 |
| CN | 104106276 | 10/2014 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Khoi V Le
(74) *Attorney, Agent, or Firm* — Kilpatrick Townsend & Stockton LLP

(57) ABSTRACT

Techniques for provisioning access data may include receiving, by a first application installed on a communication device, user input selecting an account to provision to a second application installed on the communication device. The first application may invoke the second application and send a session identifier (ID) to the second application. The second application may send a user ID associated with the second application, a device ID, and the session ID to the first application. The first application may then generate encrypted provisioning request data and send the encrypted provisioning request data to the second application. The second application may send the encrypted provisioning request data to a remote server computer to request access (Continued)

data that can be used to access a resource. The second application may receive the access data provided by the remote server computer based on validation of the encrypted provisioning request data.

16 Claims, 8 Drawing Sheets

Related U.S. Application Data

(60) Provisional application No. 62/276,167, filed on Jan. 7, 2016.

(51) Int. Cl.
*H04W 12/00* (2009.01)
*H04W 88/02* (2009.01)

(52) U.S. Cl.
CPC ....... *H04W 12/0023* (2019.01); *H04W 12/04* (2013.01); *H04L 63/083* (2013.01); *H04L 2463/121* (2013.01); *H04W 88/02* (2013.01)

(56) References Cited

U.S. PATENT DOCUMENTS

| | | | |
|---|---|---|---|
| 5,883,810 A | 3/1999 | Franklin | |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,044,360 A | 3/2000 | Picciallo | |
| 6,163,771 A | 12/2000 | Walker | |
| 6,227,447 B1 | 5/2001 | Campisano | |
| 6,236,981 B1 | 5/2001 | Hill | |
| 6,267,292 B1 | 7/2001 | Walker | |
| 6,327,578 B1 | 12/2001 | Linehan | |
| 6,341,724 B2 | 1/2002 | Campisano | |
| 6,385,596 B1 | 5/2002 | Wiser | |
| 6,422,462 B1 | 7/2002 | Cohen | |
| 6,425,523 B1 | 7/2002 | Shem Ur | |
| 6,592,044 B1 | 7/2003 | Wong | |
| 6,636,833 B1 | 10/2003 | Flitcroft | |
| 6,748,367 B1 | 6/2004 | Lee | |
| 6,805,287 B2 | 10/2004 | Bishop | |
| 6,879,965 B2 | 4/2005 | Fung | |
| 6,891,953 B1 | 5/2005 | DeMello | |
| 6,901,387 B2 | 5/2005 | Wells | |
| 6,931,382 B2 | 8/2005 | Laage | |
| 6,938,019 B1 | 8/2005 | Uzo | |
| 6,941,285 B2 | 9/2005 | Sarcanin | |
| 6,980,670 B1 | 12/2005 | Hoffman | |
| 6,990,470 B2 | 1/2006 | Hogan | |
| 6,991,157 B2 | 1/2006 | Bishop | |
| 7,003,481 B2* | 2/2006 | Banka | G06Q 30/0601 |
| | | | 705/26.1 |
| 7,051,929 B2 | 5/2006 | Li | |
| 7,069,249 B2 | 6/2006 | Stolfo | |
| 7,103,576 B2 | 9/2006 | Mann, III | |
| 7,113,930 B2 | 9/2006 | Eccles | |
| 7,136,835 B1 | 11/2006 | Flitcroft | |
| 7,177,835 B1 | 2/2007 | Walker | |
| 7,177,848 B2 | 2/2007 | Hogan | |
| 7,194,437 B1 | 3/2007 | Britto | |
| 7,209,561 B1 | 4/2007 | Shankar et al. | |
| 7,264,154 B2 | 9/2007 | Harris | |
| 7,287,692 B1 | 10/2007 | Patel | |
| 7,292,999 B2 | 11/2007 | Hobson | |
| 7,350,230 B2 | 3/2008 | Forrest | |
| 7,353,382 B2 | 4/2008 | Labrou | |
| 7,379,919 B2 | 5/2008 | Hogan | |
| RE40,444 E | 7/2008 | Linehan | |
| 7,415,443 B2 | 8/2008 | Hobson | |
| 7,444,676 B1 | 10/2008 | Asghari-Kamrani | |
| 7,469,151 B2* | 12/2008 | Khan | G06Q 20/3221 |
| | | | 455/558 |
| 7,548,889 B2 | 6/2009 | Bhambri | |
| 7,567,934 B2 | 7/2009 | Flitcroft | |
| 7,567,936 B1 | 7/2009 | Peckover | |
| 7,571,139 B1 | 8/2009 | Giordano | |
| 7,571,142 B1 | 8/2009 | Flitcroft | |
| 7,580,898 B2 | 8/2009 | Brown | |
| 7,584,153 B2 | 9/2009 | Brown | |
| 7,593,896 B1 | 9/2009 | Flitcroft | |
| 7,606,560 B2 | 10/2009 | Labrou | |
| 7,627,531 B2 | 12/2009 | Breck | |
| 7,627,895 B2 | 12/2009 | Gifford | |
| 7,650,314 B1 | 1/2010 | Saunders | |
| 7,685,037 B2 | 3/2010 | Reiners | |
| 7,702,578 B2 | 4/2010 | Fung | |
| 7,707,120 B2 | 4/2010 | Dominguez | |
| 7,712,655 B2 | 5/2010 | Wong | |
| 7,734,527 B2 | 6/2010 | Uzo | |
| 7,753,265 B2 | 7/2010 | Harris | |
| 7,770,789 B2 | 8/2010 | Oder, II | |
| 7,784,685 B1 | 8/2010 | Hopkins, III | |
| 7,793,851 B2 | 9/2010 | Mullen | |
| 7,801,826 B2 | 9/2010 | Labrou | |
| 7,805,376 B2 | 9/2010 | Smith | |
| 7,805,378 B2 | 9/2010 | Berardi | |
| 7,818,264 B2 | 10/2010 | Hammad | |
| 7,828,220 B2 | 11/2010 | Mullen | |
| 7,835,960 B2 | 11/2010 | Breck | |
| 7,841,523 B2 | 11/2010 | Oder, II | |
| 7,841,539 B2 | 11/2010 | Newton | |
| 7,844,550 B2 | 11/2010 | Walker | |
| 7,848,980 B2 | 12/2010 | Carlson | |
| 7,849,020 B2 | 12/2010 | Johnson | |
| 7,853,529 B1 | 12/2010 | Walker | |
| 7,853,995 B2 | 12/2010 | Chow | |
| 7,865,414 B2 | 1/2011 | Fung | |
| 7,873,579 B2 | 1/2011 | Hobson | |
| 7,873,580 B2 | 1/2011 | Hobson | |
| 7,890,393 B2 | 2/2011 | Talbert | |
| 7,891,563 B2 | 2/2011 | Oder, II | |
| 7,896,238 B2 | 3/2011 | Fein | |
| 7,908,216 B1 | 3/2011 | Davis et al. | |
| 7,922,082 B2 | 4/2011 | Muscato | |
| 7,931,195 B2 | 4/2011 | Mullen | |
| 7,937,324 B2 | 5/2011 | Patterson | |
| 7,938,318 B2 | 5/2011 | Fein | |
| 7,954,705 B2 | 6/2011 | Mullen | |
| 7,959,076 B1 | 6/2011 | Hopkins, III | |
| 7,996,288 B1 | 8/2011 | Stolfo | |
| 8,025,223 B2 | 9/2011 | Saunders | |
| 8,046,256 B2 | 10/2011 | Chien | |
| 8,060,448 B2 | 11/2011 | Jones | |
| 8,060,449 B1 | 11/2011 | Zhu | |
| 8,074,877 B2 | 12/2011 | Mullen | |
| 8,074,879 B2 | 12/2011 | Harris | |
| 8,082,210 B2 | 12/2011 | Hansen | |
| 8,095,113 B2 | 1/2012 | Kean | |
| 8,104,679 B2 | 1/2012 | Brown | |
| RE43,157 E | 2/2012 | Bishop | |
| 8,109,436 B1 | 2/2012 | Hopkins, III | |
| 8,121,942 B2 | 2/2012 | Carlson | |
| 8,121,956 B2 | 2/2012 | Carlson | |
| 8,126,449 B2 | 2/2012 | Beenau | |
| 8,132,723 B2 | 3/2012 | Hogg et al. | |
| 8,171,525 B1 | 5/2012 | Pelly | |
| 8,175,973 B2 | 5/2012 | Davis et al. | |
| 8,190,523 B2 | 5/2012 | Patterson | |
| 8,196,813 B2 | 6/2012 | Vadhri | |
| 8,205,791 B2 | 6/2012 | Randazza | |
| 8,219,489 B2 | 7/2012 | Patterson | |
| 8,224,702 B2 | 7/2012 | Mengerink | |
| 8,225,385 B2 | 7/2012 | Chow | |
| 8,229,852 B2 | 7/2012 | Carlson | |
| 8,265,993 B2 | 9/2012 | Chien | |
| 8,280,777 B2 | 10/2012 | Mengerink | |
| 8,281,991 B2 | 10/2012 | Wentker et al. | |
| 8,328,095 B2 | 12/2012 | Oder, II | |
| 8,336,088 B2 | 12/2012 | Raj et al. | |

(56) References Cited

U.S. PATENT DOCUMENTS

| | | |
|---|---|---|
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,407,776 B2 * | 3/2013 | Somani ............... H04L 63/0884 726/9 |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,516,487 B2 | 12/2016 | Powell et al. |
| 9,530,137 B2 | 12/2016 | Weiss |
| 9,582,267 B2 | 2/2017 | Aabye et al. |
| 9,646,303 B2 | 5/2017 | Karpenko et al. |
| 9,680,942 B2 | 6/2017 | Dimmick |
| 9,741,051 B2 | 8/2017 | Carpenter et al. |
| 9,996,835 B2 | 6/2018 | Dill et al. |
| 10,070,310 B2 | 9/2018 | Powell et al. |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0098348 A1 * | 5/2004 | Kawasaki ............... G06F 21/10 705/59 |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |

(56) References Cited

U.S. PATENT DOCUMENTS

| | | |
|---|---|---|
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |

(56) References Cited

U.S. PATENT DOCUMENTS

| | | |
|---|---|---|
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0344155 A1 | 11/2014 | Liu et al. |
| 2014/0351574 A1* | 11/2014 | Grab ............... H04L 63/0876 713/155 |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142670 A1 | 5/2015 | Zloth et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets et al. |
| 2015/0327072 A1* | 11/2015 | Powell ............... G06Q 20/36 455/411 |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0036811 A1* | 2/2016 | Shim ............... G06F 21/6245 726/7 |
| 2016/0042263 A1 | 2/2016 | Gaddam et al. |
| 2016/0065370 A1 | 3/2016 | Le Saint et al. |
| 2016/0086184 A1 | 3/2016 | Carpenter et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0094991 A1 | 3/2016 | Powell et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0308995 A1 | 10/2016 | Youdale et al. |
| 2016/0328707 A1 | 11/2016 | Wagner et al. |
| 2017/0046696 A1 | 2/2017 | Powell et al. |
| 2017/0103387 A1 | 4/2017 | Weber |
| 2017/0109745 A1 | 4/2017 | Al-Bedaiwi |
| 2017/0123789 A1 | 5/2017 | Aabye et al. |
| 2017/0186001 A1 | 6/2017 | Reed et al. |
| 2017/0200156 A1 | 7/2017 | Karpenko et al. |
| 2017/0201520 A1 | 7/2017 | Chandoor |
| 2017/0220818 A1 | 8/2017 | Nagasundaram et al. |
| 2017/0221054 A1 | 8/2017 | Flurscheim et al. |
| 2017/0221056 A1 | 8/2017 | Karpenko et al. |
| 2017/0228723 A1 | 8/2017 | Taylor |
| 2017/0270528 A1 | 9/2017 | Prakash et al. |
| 2017/0272253 A1 | 9/2017 | Lavender et al. |
| 2017/0295155 A1 | 10/2017 | Wong et al. |

(56) References Cited

U.S. PATENT DOCUMENTS

| | | |
|---|---|---|
| 2017/0364903 A1 | 12/2017 | Lopez |
| 2018/0285864 A1 | 10/2018 | Dill et al. |

FOREIGN PATENT DOCUMENTS

| | | |
|---|---|---|
| EP | 2156397 A1 | 2/2010 |
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Stubbs et al., U.S. Appl. No. 62/103,522 (unpublished), Methods and Systems for Wallet Provider Provisioning filed Jan. 14, 2015.
Flurscheim et al., U.S. Appl. No. 62/108,403 (unpublished), Wearables With NFC HCE filed Jan. 27, 2015.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Chipman, et al., U.S. Appl. 15/265,282 (Unpublished), Self-Cleaning Token Vault, filed Sep. 14, 2016.
Lopez, et al., U.S. Appl. 15/462,658 (Unpublished), Replacing Token on a Multi-Token User Device, filed Mar. 17, 2017.
Kaja, et al., U.S. Appl. No. 15/585,077 (Unpublished), System and Method Using Interaction Token, filed May 2, 2017.
International Search Report dated Apr. 18, 2017, PCT Application No. PCT/US2017/012767.
Peter Sjodin: "Authentication Protocols and Key Establishment", Dec. 31, 2006 (Dec. 31, 2006 ), XP055525598, retrieved from the Internet: URL:http://www.csc.kth.se/utbildning/kth/kurser/DD2495/natsak08/anteckningar/files/06_authproto.pdf, retrieved on Nov. 21, 2018.
European Search Report dated Dec. 11, 2018, in EP Application No. 17736532.7, 11 pages.
AU2017206119 , "First Examination Report", dated May 15, 2020, 4 pages.
EP17736532.7 , "Notice of Decision to Grant", dated Apr. 17, 2020, 2 pages.
Application No. CN201780005545.3, Office Action, dated Aug. 4, 2020, 13 pages.

\* cited by examiner under the provisions of 35 U.S.C. § 120.

SYSTEMS AND METHODS FOR DEVICE PUSH PROVISIONING

CROSS-REFERENCES TO RELATED CASES

This application is a continuation of U.S. application Ser. No. 15/402,095 filed on Jan. 9, 2017, which is a non-provisional and claims the benefit of priority to U.S. Provisional Application No. 62/276,167, filed Jan. 7, 2016, the entire content of which are herein incorporated by reference in their entirety for all purposes.

BACKGROUND

Communication devices can be provisioned with access data to allow a user of the communication device to obtain access to a resource. For instance, a remote server associated with the resource provider can transmit the requisite access data to be loaded onto the communication device. In some cases, a communication device can have more than one application installed on the device that allows the user to access the resource. For example, a communication device can have multiple email applications that can each be used to access a particular email account. As another example, a communication device can have multiple transaction applications that can each be used to conduct a transaction using a particular account.

In order to provision each application with the access data, a user may have to manually enter account identifying information into each individual application to identify the user's account associated with the resource provider. In addition, each application may require a separate authentication process to provision the access data. This can be a cumbersome process that adds unwanted friction to the user experience.

Some conventional systems may allow one application to request the access data be provisioned onto another application. For example, a first application may request an authentication code from a remote server associated with the resource provider, and provide the authentication code to a second application installed on the communication device. Thereafter, the second application may send the authentication code to the remote server to request the access data. However, such systems may have a security risk in that the access data transmitted from the remote server to the communication device can be susceptible to interception by an unauthorized party. If an unauthorized party comes into possession of the access data, the unauthorized party may use the access data to access the resource without permission from the user.

Embodiments of the invention address these and other problems individually and collectively.

BRIEF SUMMARY

Embodiments of the invention can include systems and methods which provide techniques for provisioning access data from a first application to a second application installed on a communication device.

Some embodiments of the invention are directed to a push provisioning method. The method may include receiving, by a first application installed on a communication device, after a user successfully authenticates to the first application, user input selecting an account to provision to a second application installed on the communication device. The method may also include, in response to receiving the selection of the account to provision, invoking the second application by the first application and may also include additionally sending a session identifier (ID) to the second application. The first application may use the session ID to accurately track and associate the data sent by the second application, with the user authenticated in the first application.

The method may further include sending, by the second application, a user ID associated with the second application, a device ID, and the session ID to the first application. The method may additionally include generating, by the first application, encrypted provisioning request data including an account ID of the account to provision, the user ID, and the device ID provided by the second application. The method may further include sending, by the first application, the encrypted provisioning request data to the second application. The method may also include sending, by the second application, the encrypted provisioning request data to a remote server computer, along with the user ID and the device ID associated with the user in the second application. The remote server computer may utilize the user ID, the device ID and the account ID of the second application (requestor) to validate against the user ID, the device ID and the account ID provided by the first application, which are included inside the encrypted portion of the request, ensuring that the end to end exchange of data is secure and is made accessible only to the specified user. The method may further include receiving, by the second application, access data provided by the remote server computer based on validation of the encrypted provisioning request data. The method may also include provisioning, by the second application, the access data onto the second application.

Some embodiments of the invention are directed to a communication device configured to perform the above-noted method.

These and other embodiments of the invention are described in further detail below.

DETAILED DESCRIPTION

Figure 1:
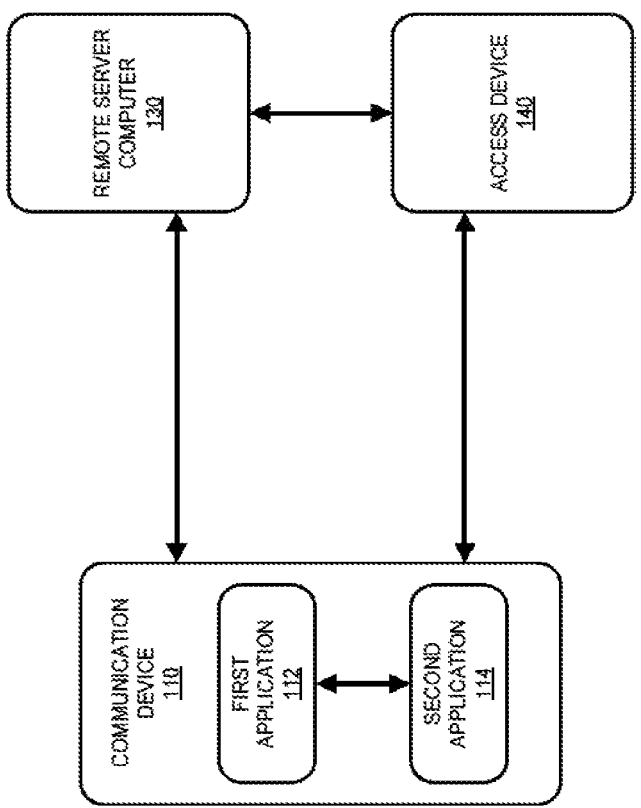
FIG. 1 shows a block diagram of a system according to some embodiments of the invention.

Embodiments of the invention can include systems and methods which provide techniques for provisioning access data from a first application to a second application installed on a communication device. The systems and methods can provide an improved experience for users and parties involved in the provisioning process by allowing one or more applications residing on the communication device to push access data securely to one or more other applications residing on the communication device. In some embodiments, the Identification and Verification (ID&V) process for authenticating the user of one application (e.g., the first application) can be leveraged to provision the access data to another application (e.g., the second application) such that the user can avoid entering information required for access data provisioning in each individual application residing on the mobile device. As such, an addition step up process to authenticate the user can be avoided and thereby reducing friction in the user experience. In some embodiments, the access data being provisioned can be bound to the communication device such that the access data cannot be used with another communication device. In other words, once the access data is provisioned to a particular communication device, any attempts to use the access data from a different communication device to obtain access to the resource associated with the access data will be denied, Prior to discussing embodiments of the invention, descriptions of some terms may be helpful in understanding embodiments of the invention.

A "communication device" may be any electronic device that can be operated by a user to communicate with another device. A communication device may also provide remote communication capabilities to a network. Examples of remote communication capabilities include using a mobile (cellular) network, wireless data network (e.g., 3G, 4G or similar networks), Wi-Fi, Wi-Max, or any other wireless or wired communication medium that may provide access to a network such as the Internet or a private network. Examples of communication devices include mobile phones (e.g., cellular phones), PDAs, tablet computers, net books, laptop computers, personal music players, hand-held specialized readers, wearable devices (e.g., watches), vehicles (e.g., cars), smart appliances, or other network connected devices, etc. A communication device may comprise any suitable hardware and software for performing such functions, and may also include multiple devices or components (e.g., when a device has remote access to a network by tethering to another device—i.e., using the other device as a relay—both devices taken together may be considered a single communication device).

"Authentication data" may include any data suitable for authenticating a user or communication device. Authentication data may be obtained from a user or a communication device that is operated by the user. Examples of authentication data obtained from a user may include PIN (personal identification number), username/password, biometric data, etc. Examples of authentication data that may be obtained from a communication device may be include device serial numbers, hardware secure element identifiers, device fingerprints, phone numbers, IMEI numbers, etc.

A "remote server computer" may include a powerful computer or cluster of computers accessible via a network. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more communication devices. In some embodiments, a remote server computer can be operated by or associated with a resource provider such as a service provider (e.g., a web service provider), transit or building operator, ticketing operator, payment processing network or organization, etc.

"Access data" may include any suitable data that can be used to access a resource or create data that can access a resource. In some embodiments, access data may include credentials (e.g., PIN, username/password, passcode, etc.) or account information that can be used to access the resource. For example, the access data can be login information used for accessing a web service. As another example, the access data can be account information for a payment account. Account information may include an account identifier such as a primary account number (PAN), verification values (e.g., CVV, CVV2, dCVV, dCVV2), or other account data that can be used to verify an account. In some embodiments, access data may be data that can be used to activate account data. For example, in some cases, account information may be stored on a communication device, but may not be activated until specific information is received by the communication device. This specific information may be characterized as access information in some embodiments. In some embodiments, access data can include data that can be used to access a restricted location. Such information may be, for example, ticket information for an event, data to access a building, transit ticket information, etc. In some embodiments, the access data can be pseudo-credentials or pseudo account information such as a token that can be used as a substitute for the real credentials or real account identifier. In contrast to a real credentials or real account identifier which can be used from any device to access a resource, access data in the form of pseudo-credentials or pseudo account information can be bound to a particular communication device such that the access data can only be used from the particular communication device to access the resource.

A "token" may include a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "application" may be a computer program executable from a communication device that is used to perform one or more tasks. In some embodiments, performing a task may involve using access data to access a resource. Examples of applications may include a browser application to access the Internet, an email application to access an email account, a transit application to access a restricted area, a transaction application to access a payment or banking account to conduct a transaction, etc.

A "digital wallet" application can be an application that stores information that can be used in a variety of transactions. For example, a digital wallet application can store user profile information, payment information (e.g. PANs or primary account numbers, payment tokens (i.e., PAN substitutes), verification values such as CVVs, etc.), bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

A "timestamp" may include data relating to any suitable time. For example, a timestamp may be a time, date, month, year, or any suitable combination of the above. The timestamp element could also be derived from the time, date, month, year, or any suitable combination of the above. An encrypted timestamp element may be a data element that may include an encrypted time, date, month, year, and/or suitable combination of the above.

An "access device" may be any suitable device for obtaining access to a resource. An access device may generally be located in any suitable location, such as at the entrance of a restricted area or at a location of a merchant. An access device may be in any suitable form. Some examples of access devices include POS devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user communication device.

An "issuer" may typically refer to a business entity (e.g., a bank) that maintains an account for a user that is associated with a communication device such as an account enrolled in a mobile application installed on a portable communication device. An issuer may also issue account parameters associated with the account to a communication device. An issuer may be associated with a host system that performs some or all of the functions of the issuer on behalf of the issuer.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TOES), data encryption standard (DES), advanced encryption standard (AES), etc.

FIG. 1 shows a block diagram of a system according to some embodiments of the invention. FIG. 1 shows a communication device 110 in communication with a remote server computer 130. The communication device 110 may store a first application 112 and a second application 114.

The remote server computer 130 may be operated by or associated with a resource provider, and can be configured to provision the communication device 110 with access data. It may include a processor and a computer readable medium comprising code which causes the processor to perform any suitable method associated with provisioning the communication device 110 with access data. It may also maintain a database of access data and device identifiers (e.g., an IP or internet protocol address, serial number, IMEI number, or phone number, etc.) for various communication devices provisioned with access data. In some embodiments, remote server computer 130 may provision access data to the first application 112. Provisioning the first application 112 may require the user to manually enter credentials used for the provisioning process (e.g., account information associated with the user of communication device 110). Once provisioned with the access data, the first application 112 may provide the access data to an access device 140 to obtain access to a resource. Access device 140 may forward the access data to remote server computer 130 for verification. In some embodiments, access device 140 can be part of remote server computer 130 (e.g., if the resource being accessed is a web-based service provided by remote server computer 130).

In accordance with the techniques described herein, the first application 112 can be used to push the access data to the second application 114 installed on communication device 110. In some embodiments, provisioning the second application 114 can be done without requiring the user to reenter the account information used for the provisioning process because the user and the user's account has already been verified by the remote server computer 130 during provisioning of the first application 112. Once provisioned with the access data, the second application 114 may provide the access data to an access device 140 independently from the first application 112 to obtain access to a resource.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
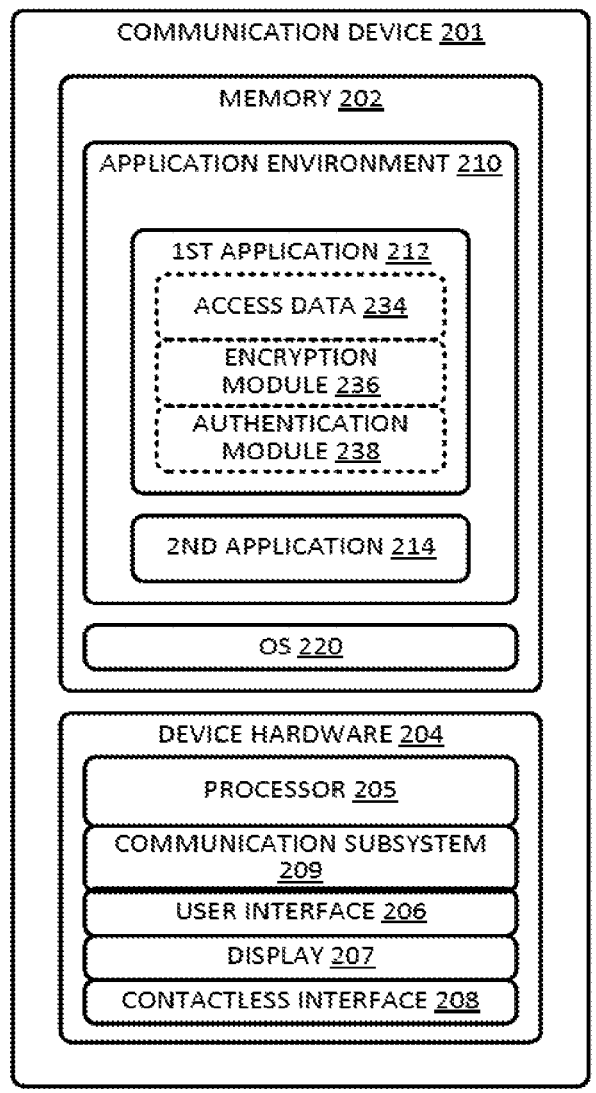
FIG. 2 shows a block diagram of a communication device according to some embodiments of the invention.

FIG. 2 illustrates a block diagram of a communication device 201, according to some embodiments. Communication device 201 may include device hardware 204 coupled to a memory 202. Device hardware 204 may include a processor 205, a communications subsystem 209, use interface 206, a display screen 207 (which may be part of user interface 206), and an optional contactless interface 208 (e.g., if communication device 201 is a portable communication device or has wireless communication functionalities). Processor 205 can be implemented as one or more integrated circuits (e.g., one or more single core or multicore microprocessors and/or microcontrollers), and is used to control the operation of communication device 201. Processor 205 can execute a variety of programs in response to program code or computer-readable code stored in memory 202, and can maintain multiple concurrently executing programs or processes. Communications subsystem 209 may include one or more RF transceivers and/or connectors that can be used by communication device 201 to communicate with other devices and/or to connect with external networks. User interface 206 can include any combination of input and output elements to allow a user to interact with and invoke the functionalities of communication device 201. In some embodiments, display screen 207 may be part of user interface 206.

Contactless interface 208 may include one or more RF transceivers to interact with a contactless reader of an access device to access a resource (e.g., to enter a restricted area, to conduct a transaction, etc.). In some embodiments, contactless interface 208 can be accessed by applications in application environment 210 or operating system 220 to communicate with an access device. In some embodiments, display 207 can also be part of contactless interface 208, and is used, for example, to communication with an access device using QR codes, bar codes, or other optical communication techniques, etc.

Memory 202 can be a non-transitory computer readable storage medium implemented using any combination of any number of non-volatile memories (e.g., flash memory) and volatile memories (e.g., DRAM, SRAM), or any other computer readable storage medium, or a combination thereof media. Memory 202 may store a OS 220 and an application environment 210 where one or more mobile applications (e.g., applications 212 and 214) to be executed by processor 205 reside.

According to some embodiments, the first application 212 can be an application associated with and/or provided by a resource provider, and the first application 212 is used to access a resource provided by the resource provider. For example, the first application 212 can be a transit application used to access a restricted area provided by a transit or building operator, an issuer application used to conduct transactions using an account issued by the issuer, or a web-service application used to access a web-based service such as email, photo-sharing, social media, etc. provided by the web-based service provider. When the user of communication device 201 installs the first application 212, the user may initiate an enrollment process with a remote server computer to provision the first application 212 with access data 234 that is used to access the resource associated with the resource provider. The user may be requested to manually enter account information such as a real account identifier to obtain access data 234. In some embodiments, the provisioned access data 234 can be used as a substitute for the real account identifier to obtain access to the resource. For example, the first application 212 can provide the provisioned access data 234 in the form of pseudo-credentials or pseudo-account identifier such as a token to an access device to gain access to the resource.

In some embodiments, the first application 212 may include an authentication module 238 that is used to authenticate the user to use the first application 212. For example, the authentication module 238 may request the user to enter a PIN or other user identification information to authenticate the user each time the user attempts to use the first application 212. The authentication module 238 may authenticate the user locally at the communication device 201, or send the user identification information to a remote sever computer to authenticate the user according to the identification and verification (ID&V) requirements of the resource provider.

The first application 212 may also include an encryption module 236 that is used to encrypt sensitive data provided by the first application 236. For example, during installation or enrollment, the first application 212 can be provided with a shared key or shared secret that is only known to the first application 212 and the remote server computer. The first application 212 can then encrypt communications intended for the remote server computer using the shared key or derivative keys derived from the shared key or shared secret. The remote server computer can then decrypt the communication using the shared key or derivative keys derived from the shared key or shared secret to verify that the communication originated from the first application 212. In some embodiments, encryption module 236 can be part of the OS 220, and the first application 212 may encrypt data by calling the encryption service provided by OS 220.

In some embodiments, the first application 212 may encrypt data used in a provisioning request (e.g., a PAN) to push access data to another application. The encryption can be performed using JavaScript Object Notation (JSON) techniques such as JSON Web Encryption (JWE) or using any other suitable encryption technique. The JWE techniques may use the shared key or shared secret to encrypt the data. In some embodiments, compact serialization style (e.g., elements separated by ".") can be used. All fields are can be base 64 and URL Safe encoded. A 256-bit Content Encryption Key (CEK) can also be used. In some embodiments, an AES encryption algorithm such as AES-GCM-256KW algorithm for encryption of the CEK, and a 96-bit Initialization Vector (IV) can be used. An Authentication Tag (e.g., e.g., 128-bits) can also be generated as an additional output of the AES-GCM-256 encryption. String to byte and vice-versa conversions can be performed using UTF-8 charset.

Communication device 201 may also include a second application 214 that is used to access the same resource accessible by the first application 212. The second application 214 can be a third-party application that is provided by an entity different from the resource provider. In some embodiments, the second application 214 can be a multi-operator transit application that can be used to access various restricted areas associated with multiple transit or building operators, a digital wallet application that can be used to conduct transactions using various account issued by multiple issuers, or a multi-functional web-service application that can be used to access various web-based services provided by multiple web-based service providers (e.g., a digital assistant application that can access multiple email accounts of the user, a social media application that can access multiple social media accounts of the user, etc.).

According to some embodiments, the first application 212 can be used to provision the access data for accessing the resource to the second application 214. For example, the first application 212 can be used to generate encrypted provisioning request data that is sent to the remote server computer to request access data for the second application 214. The provisioning request data can be encrypted based on a shared key or shared secret known only to the first application and the remote server computer. Since the first application 212 is provided by the resource provider, the first application 212 can be considered a trusted application by the remote server computer. If the remote server computer is able to properly decrypt the provisioning request data and thus verify that the provisioning request data was generated by the trusted first application 212, the remote serve can then generate the access data for provisioning to the second application 214. Both the access data provisioned to the first application 212 and the second application 214 can be linked to the same account of the user, and thus allowing either application to access the resource using the same account.

In some embodiments, although the access data provisioned to the second application 214 is linked to the same account, the access data provisioned to the second application 214 can be the same or different than the access data provisioned to the first application 212. For example, the first application 212 can be provisioned with the real credentials, whereas the second application 214 can be provisioned with pseudo-credentials or pseudo-account information (e.g., a token that is a substitute for a real account identifier). As another example, both the first application 212 and the second application 214 can be provisioned with the same pseudo-credentials or pseudo-account information. As a further example, the first application 212 can be provisioned with a first pseudo-credentials or a first pseudo-account information, whereas the second application can be provisioned with a second pseudo-credentials or second pseudo-account information that is linked to the same account. In this latter case, the access data provisioned to a particular application can be bound to the specific application such that the access data provisioned to one application cannot be used from another application. In some embodiments, the access data being provisioned can also be bound to the communication device such that the access data cannot be used with another communication device.

Figure 3:
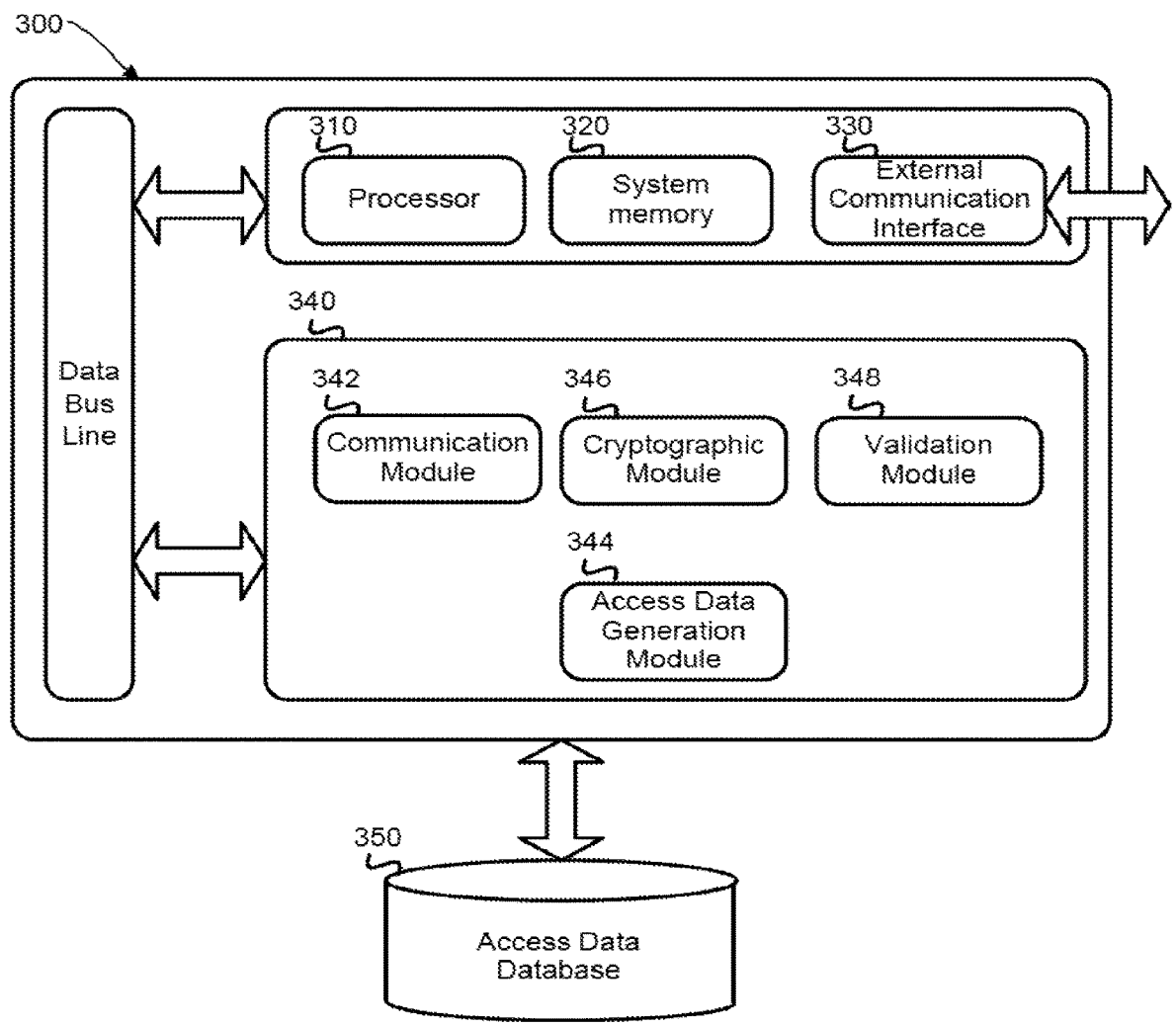
FIG. 3 shows a block diagram of a remote server computer according to some embodiments of the invention.

FIG. 3 shows a block diagram of an remote server computer 300 according to some embodiments of the invention. Remote server computer 300 can be operated by or associated with a resource provider that provides a resource accessible from a communication device. For example, remote server computer 300 can be associated with a web-service provider, a transit or building operator, an issuer, a payment processing network or organization, etc. In some embodiments, the remote serve computer may provide and/or support an application (e.g., first application 112 or 212) installed on a communication device that is used to access a resource associated with remote server computer 300. The remote server computer 300 may include a processor 310, which may be coupled to a system memory 320 and an external communication interface 330. A computer readable medium 340 may also be operatively coupled to the processor 310. The computer readable medium 340 may comprise a number of software modules including a communication module 342, cryptographic module 346, a validation module 348, and an access data generation module 344.

The communication module 342 may comprise code that causes the processor 310 to generate messages, forward messages, reformat messages, and/or otherwise communicate with other entities. For example, communication module 342 can be used to facilitate communications between remote server computer 300 and a communication device operated by a user. Communication module 342 may also facilitate communications with access data database 350 (or with a separate computer that has access to access data database 350) to lookup access data information or to write access data generated by remote server computer 300 to the access data database 350.

The cryptographic module 346 may include any suitable encryption/decryption algorithms to encrypt or decrypt data. For example, the cryptographic module 346 may decrypt an encrypted payload received from a communication device. The encrypted payload may include encrypted provisioning request data generated by an application installed on the communication device. Suitable data encryption algorithms may include DES, triple DES, AES, etc. The cryptographic module 346 may utilize symmetric or asymmetric encryption techniques to encrypt/decrypt and/or verify data. It may also store encryption keys that can be used with such encryption algorithms. For example, a shared key or shared secret can be established between an application installed on the communication device and remote server computer 300, and encrypted communications originating from the application can be decrypted using the shared key or shared secret, or a derivative key derived from the shared information.

The validation module 348 may comprise code, which causes the processor 310 to validate data from a user's communication device. For example, during provisioning of access data to a communication device, validation module 348 may verify the account information provided in the provisioning request. This may involve verifying that the account information corresponds to a valid account. Validation module 348 may also carry out an ID&V process to verify the user of the communication device. For example, validation module 348 may verify a PIN or other user identifying information requested from the user to authenticate the user. If the information is validated, validation module 348 may request access data generation module 344 to generate access data for provisioning to the communication device.

In some embodiments, validation module 348 can also be used to verify the access data provided by the communication device when the communication device is attempting to access the resource associated with the service provider. For example, the communication device may provide access data previously provisioned on the communication device to an access device, and the access device may forward the access data (e.g., in an authorization request message) to remote server computer 300. Upon receiving the access data, validation module 348 may query the access data database 350 to determine if the received access data is valid. In some embodiments, if the access data is bound to the communication device, validation module may also verify that the access data was provided by the corresponding communication device. If the received access data is in the form of pseudo-credentials or pseudo-account information, validation module 344 may also retrieve the real credentials or real account information from access data database 350 if such information is needed to authorize access to the resource.

The access data generation module 344 may include code for implementing an algorithm to generate access data for provisioning to an application of a communication device. Access data generation module 344 can be initiated by validation module 348 to generate the access data upon validation of the provisioning request data. In some embodiments, if the access data being provisioned is in the form of pseudo-credentials or pseudo-account information (e.g., a token), the access data can be generated randomly or be based on the actual credentials or account information. In some embodiments, the access data can be generated by selecting the access data from a list of predefined access data for a particular account. If the access data is generated based on the actual credentials or account information, the access data can be generated by encrypting the credentials or account information using data associated with the provisioning request such as a session ID associated with the request, device ID of the communication device requesting the access data, application ID of the application requesting or being provisioned with the access data, or user ID associated with the user of the communication device, etc., or any combination thereof. For example, a combination of one of more pieces of data from the provisioning request can be used to generate an encryption key that is used to encrypt the actual credentials or actual account information to generate the access data. In some embodiments, instead of relying on encryption, the access data can be generated by performing one or more mathematical operations on the actual credentials or actual account information. In some embodiments, the mathematical operations may use any combination of the provisioning request data as operands (e.g., adding the device ID to the actual account information, etc.). The access data can also be generated by combining different portions of the actual credentials or account information with portions of any combination of the provisioning request data (e.g., concatenation of different digits or characters from the various pieces of data). In some embodiments, the access data generated by the access data generation module 344 can be written to access data database 350.

Access data database 350 can be coupled to remote server computer 300 or can be accessible by remote server computer 300 via a separate computer. Access data database 350 can store the access data generated by remote server computer 300 and associate the access data with information that may be needed to validate the access data when the access data is received to request access to a resource. For example, access data database 350 can store the access data together with the real credentials or real account information for which the access data substitutes for. In some embodiments, if the access data is bound to a particular communication device and/or particular application, the access data can be stored together with the device ID of the communication device or application ID of the application that was received as part of the provisioning request data. In this manner, when the access data is received, the access data database 350 can be queried to retrieve the device ID and/or the application ID to validate that the access data is being used with the proper communication device and/or application that was provisioned with the access data.

Figure 4:
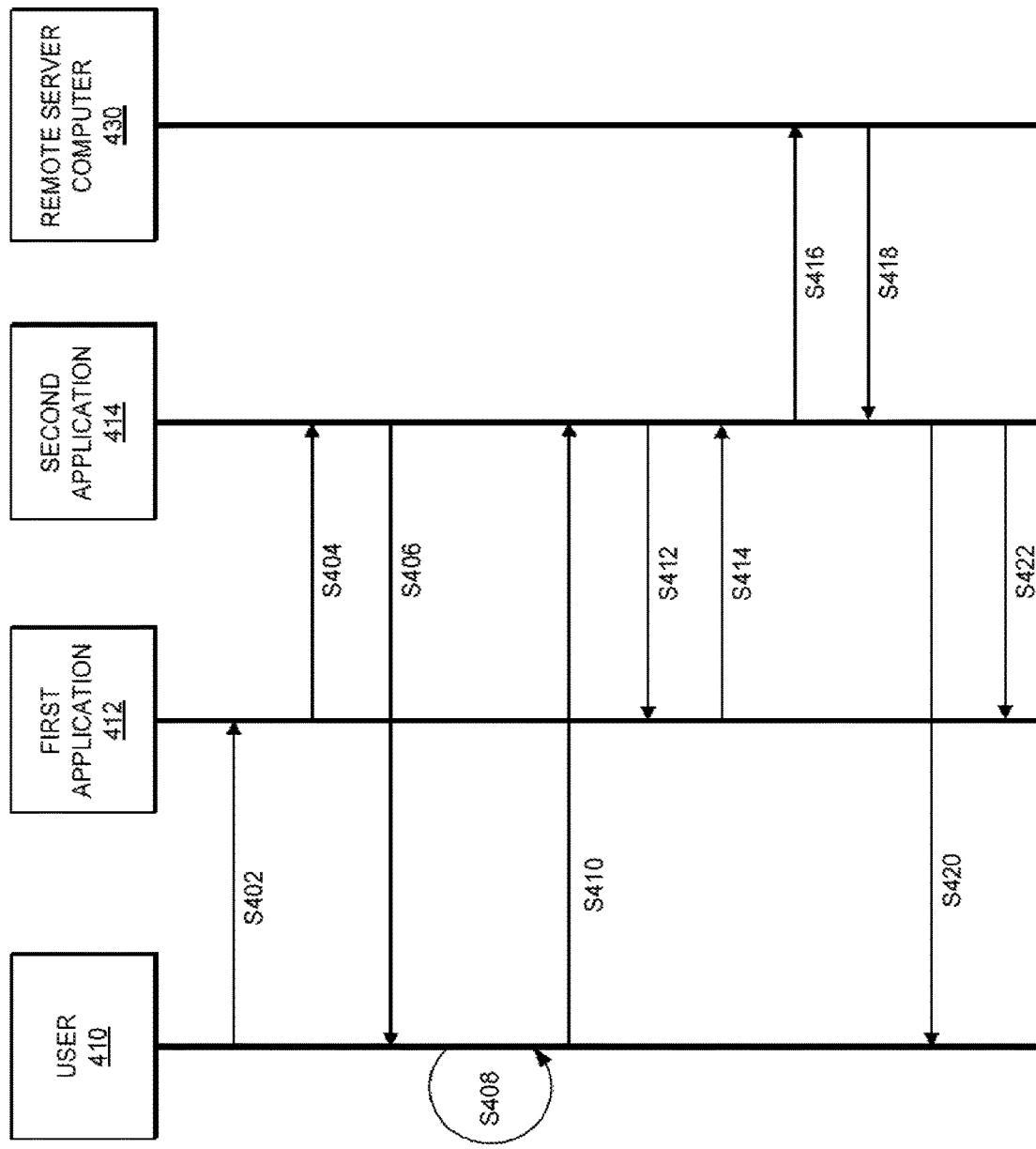
FIG. 4 illustrates a flow diagram illustrating a process flow according to some embodiments of the invention.

FIG. 4 illustrates a flow diagram illustrating a process flow according to some embodiments of the invention. In the process flow illustrated in FIG. 4, a first application 412 installed on a communication device may push access data for provisioning to a second application 414 installed on the communication device. In some embodiments, the first application 412 can be an application provided by a resource provider such as a web-service application used to access a web-based service such as email, photo-sharing, social media, etc. provided by a web-based service provider, a transit application used to access a restricted area provided by a transit or building operator, an issuer application used to conduct transactions using an account issued by the issuer, etc. In some embodiments, the second application 414 is an application that can be used to access the same resource accessible by the first application 412, and can be provided by a third-party. For example, the second application 414 can be a multi-functional web-service application that can be used to access various web-based services provided by multiple web-based service providers (e.g., a digital assistant application that can access multiple email accounts of the user, a social media application that can access multiple social media accounts of the user, etc.), a multi-operator transit application that can be used to access various restricted areas associated with multiple transit or building operators, a digital wallet application that can be used to conduct transactions using various account issued by multiple issuers, etc.

At step S402, a user 410 of a communication device may interact with the first application 412 residing on the communication device to initiate provisioning of the access data to the second application 414. The first application 412 may be an application that is already familiar to the user 410 that the user has previously used, and access data for accessing a resource associated with the first application 412 may have already been provisioned to the first application 412 during an initial enrollment process. If user 410 is not already logged on to the first application 412, user 410 may be requested to enter login information such as a PIN or password to authenticate the user. Once the user has successfully logged onto the first application 412, the user can be assumed to be authenticated because the user has already gone through an ID&V process during the initial enrollment process of the first application 412. User 410 may then select the push-provisioning feature of the first application 412 on the user interface of the communication device. The first application 412 may present a list of other applications that the first application 412 can provision access data to. The other applications may include the second application 414. The user 410 may then select the second application 414 from the list of applications presented by the first application 412.

At step S404, after the user 410 selects the second application 414 for provisioning, the first application 412 may invoke and launch the second application 414. The first application 412 may send a session identifier (ID) that identifies the current provisioning session to the second application 414. The session ID may be a unique identifier (e.g., a random number, counter value, etc.) that may be short lived and may be uniquely associated with the user's account associated with the first application 412. In some embodiments, the session ID is generated by the first application 412 or can be provided to the first application 412 by the remote server computer 430. The first application 412 may use the session ID to track and associate the data sent by the second application 414 with the user authenticated in the first application 412.

At step S406, the second application 414 may request the user 410 to enter login information such as a user ID associated with the second application 414 if the user has not already logged in. In some embodiments, the login request by the second application 414 may be in the form of a "pop-up" window that may appear while the first application 412 is still opened. In some embodiments, the second application 414 may temporarily appear on the display of the communication device to accept the user's login information, and then the user may be returned to the first application 412. At step S408, the user 410 may enter login information such as a user ID associated with the second application 414 to login to the second application 414. At step S410, the login information is provided to the second application 414.

At step S412, if the user successfully logs into the second application 414, the second application 414 may send the user ID of the user associated with the second application 414, a device ID identifying the communication device, and the session ID to the first application 412. The user ID may identify the user 410 that logged in to the second application 414 in step S408. The device ID may be a unique device ID associated with the communication device 410. In some embodiments, the device ID may uniquely identify the specific installation of the second application 414 on the communication device 410. The session ID may be the session ID received by the second application 414 from the first application 412 in step S404. In some embodiments, the second application 414 may also send an application ID that uniquely identifies the second application 414 to the first application 412.

After the second application sends the user ID, device ID, and session ID to the first application 412, the first application may generate an encrypted provisioning request by encrypting provisioning request data. The provisioning request data being encrypted may include an account ID (e.g., a PAN) of the account for which the access data is being provisioned to the second application 414. The account ID is available to the first application 412 because the account used for accessing the resource has previously been provisioned to the first application 412. The provisioning request data being encrypted may also include the, user ID, and the device ID received by the first application 412 from the second application 414. In some embodiments, provisioning request data being encrypted may also include the session ID and/or application ID of the second application 414. The encrypted provisioning request data may also include a timestamp indicating when the encrypted provisioning request was generated.

At step S414, after the first application 412 generates the encrypted provisioning request, the first application 412 may send the encrypted provisioning request including the encrypted provision request data to the second application 414. In some embodiments, the first application 412 may also provide an unencrypted application ID of the first application 412 to the second application 414. In some embodiments, the first application 412 may also provide an authentication indicator that indicates whether the user has been authenticated by the first application 412.

At step S416, after the first application 412 provides the encrypted provisioning request to the second application 414, the second application 414 may send the encrypted provisioning request to the remote server computer 430 for validation of the provisioning request. In some embodiments, the second application 414 may send the unencrypted application ID of the first application 412 together with the encrypted provisioning request to the remote server computer 430 such that the remote server computer 430 can retrieve the appropriate key or shared secret to decrypt the encrypted provisioning request. In some embodiments, the second application 414 may also send the authentication indication to the remote server computer 430. The second application 414 may send the encrypted provisioning request to the remote server computer 430 via an enrollment Application Program Interface (API).

Upon receiving the encrypted provisioning request, the remote server computer 430 may validate and/or verify the data in the encrypted provisioning request. The remote server computer 430 may decrypt the encrypted provisioning request using a shared key or shared secret known to the remote server computer 430 and the first application 412 to access the data elements (e.g., any one or more of account ID, user ID, device ID, session ID, timestamp, application ID, etc.) within the encrypted provisioning request. The remote server computer 430 can verify that the encrypted provisioning request was generated by the first application 412 if the remote server computer 430 can properly decrypt the provisioning request. If the remote server computer 430 verifies that the encrypted provisioning request was generated by the first application 412, the remote server computer 430 can continue with the validation process because the first application 412 is a trusted application of the remote server computer 430. If the remote server computer 430 determines that the encrypted provisioning request did not originate from the first application 412, the remote server computer 430 may terminate the provisioning session.

The remote server computer 430 may then analyze and validate the data elements within the decrypted provisioning request. The validation may include analyzing the timestamp in the decrypted provisioning data. For example, the timestamp may be compared to a current time at which the remote server computer 430 received the encrypted provisioning data from the second application 414. The remote server computer 430 may validate the provisioning request if the difference between the current time and the time indicated by the timestamp is less than a predefined time threshold. For example, if the difference is less than 20 minutes, the remote server computer 430 may validate the provisioning request. In some embodiments, if the session ID was provided by the remote server computer 430, the timestamp can be omitted from the provisioning request, and the remote server computer 430 can determine if the provisioning request was received within the predefined time threshold by comparing the time at which the remoter sever computer 430 provided the session ID to the first application 412 and the time at which the provisioning request was received. The validation may also include determining whether the account ID corresponds to a valid account ID associated with the first application 412 and the resource provider, that the user ID is a valid user ID for the second application 414, and/or that the device ID corresponds to a valid communication device on which the first application 412 was installed.

In some embodiments, if the authentication indicator indicating whether the user has been authenticated by the first application 412 is provided to the remote sever computer 430, the remote sever computer 430 can determine whether any additional step-up authentication is required. For example, if the authentication process of the first application 412 meets the requirements of the ID&V process of the resource provider, and the authentication indicator indicates that the user has been successfully authenticated by the first application 412, then no additional step-up authentication may be necessary, and the remote server computer 430 can provision access data to the second application 412 without requiring the user to manually enter any additional authentication information.

After the remote server computer 430 validates the provisioning request, the remote server computer 430 may generate access data that the second application 414 can use to access a resource, and send the access data to the second application 414 at step S418. For example, the access data may include user credential data that the second application 414 can use to access a service associated with the first application 412 and/or the remote server computer 430. In some embodiments, the access data may include a token that is a substitute for the account ID. For example, if the account ID is a primary account number (PAN), the access data may include a token that is a substitute for the PAN and can be used to conduct transactions. In some embodiments, the access data can be bound to the communication device 410 and may not be used with a different communication device. For example, the access data can be linked to the device ID received in the provisioning request. In this manner, if an attempt to access the resource using the access data is received from a communication device with a different device ID, the access to the resource can be denied. In contrast to conventional push provisioning techniques that may not bound the access data to a device ID, the techniques described herein can prevent the access data from being used by an unauthorized party if the access data is intercepted by the unauthorized party during the provisioning process.

Upon receiving the access data, the second application 414 can complete the provisioning process, for example, by storing the access data in a secured memory location accessible by the second application 414. Thereafter, the second application 414 can provide the access data, for example, to an access device to gain access to the resource associated with the access data. At step S420, the second application 414 may then, either directly or via the first application 412, display or present a success message to the user 410 via the user interface of the communication device 410 to indicate that the second application 414 has been successfully provisioned with the access data. At step S422, the second application 414 can redirect the user 410 back to the first application 412, and the first application 412 may also display a success message to indicate that the provisioning process has completed.

Figure 5:
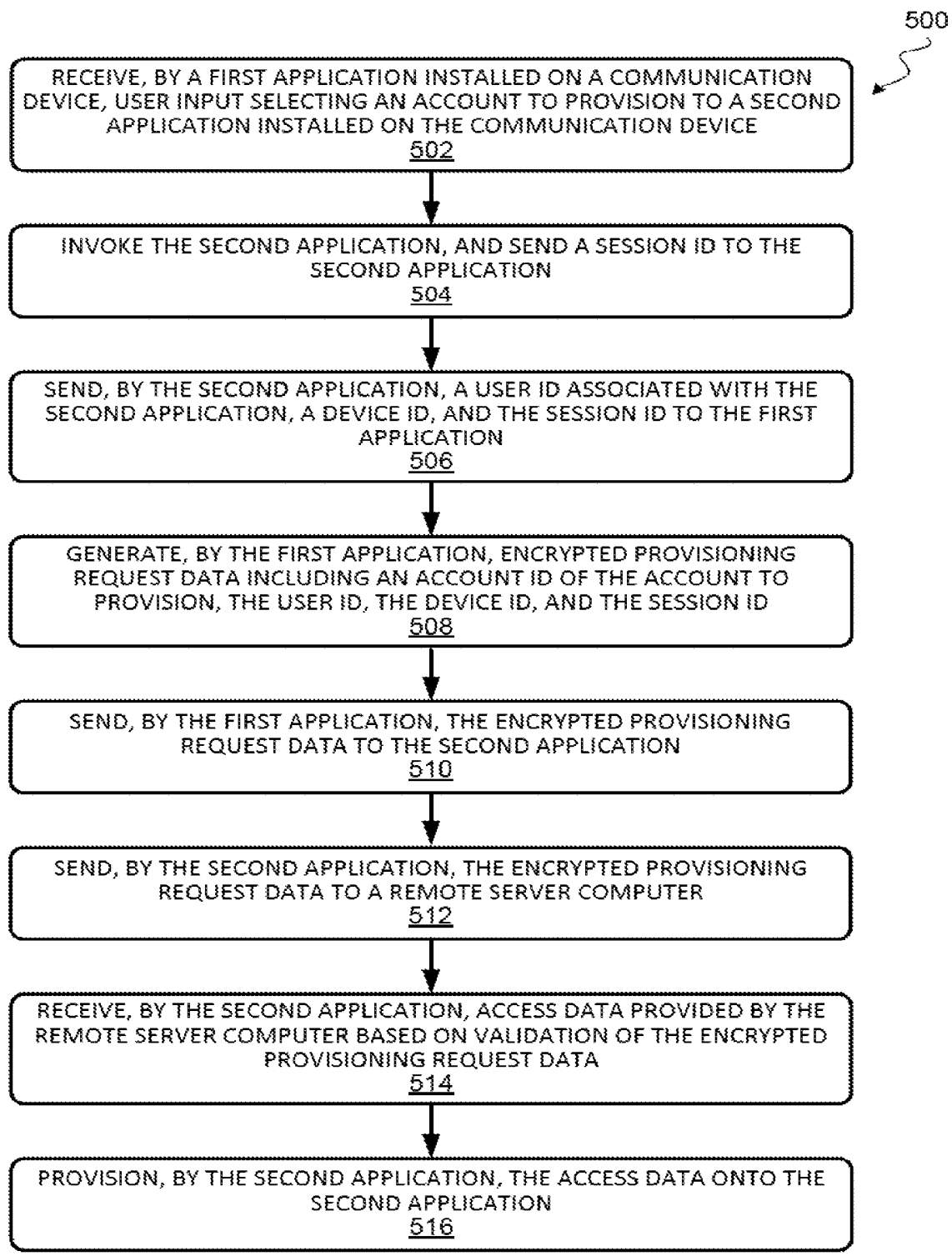
FIG. 5 illustrates a flow chart illustrating a process flow according to some embodiments of the invention.

FIG. 5 illustrates a flow diagram illustrating a process flow 500 according to some embodiments of the invention. Process flow 500 can be used for pushing access data by a first application to a second application.

At block 502, a first application installed on a communication device may receive user input selecting an account to provision to a second application installed on the communication device. At block 504, in response to receiving the selection of the account to provision, the first application may invoke the second application and send a session identifier (ID) to the second application. At block 506, the second application may send a user ID associated with the second application, a device ID, and the session ID to the first application. At block 508, the first application may generate encrypted provisioning request data including an account ID of the account to provision, the user ID, and the device ID. In some embodiments, the encrypted provision request data may also include other data elements such as the session ID. At block 510, the first application may send the encrypted provisioning request data to the second application. At block 512, the second application may send the encrypted provisioning request data to a remote server computer associated with a resource provider to request access data that can be used to access the resource.

At block 514, the second application receives the access data provided by the remote server computer based on validation of the encrypted provisioning request data. In some embodiments, the validation of the encrypted provisioning request data may include decrypting the received encrypted provisioning request data using a key associated with the first application to determine that the encrypted provisioning request data was generated by the first application. In some embodiments, the encrypted provisioning request data may include a timestamp, and the validation of the encrypted provisioning request data may include determining whether a difference between a time at which the encrypted provision request data was received by the remote server computer and the time indicated in the timestamp is within a predefined time threshold. In some embodiments, the validation of the encrypted provisioning request data may include determining that the account ID is a valid account ID associated with first application.

At block 516, the second application provisions the access data onto the second application. In some embodiments, the access data may include user credential data that the second application can use to access a service associated with the first application. In some embodiments, the access data can be a token that is a substitute for the account ID. In some embodiments, the access data may allow a user of the communication device to access a building. In some embodiments, the access data provided by the remote server computer can be bound to the communication device and cannot be used with a different communication device.

Figure 6:
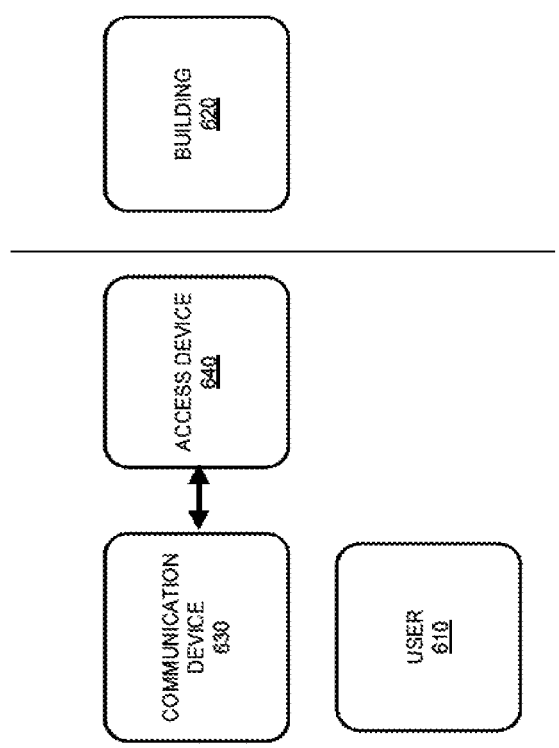
FIG. 6 illustrates a block diagram of a building access system according to some embodiments of the invention.

FIG. 6 illustrates a building access system including a communication device that is provisioned with access data and that can allow a user to access a location such as a building, according to some embodiments. The communication device 630 can been provisioned with access data according to the techniques described herein and be operated by a user 610. The communication device 630 can interact with the access device 640 and pass access data to the access device 640 (e.g., by launching the application provisioned with the access data). The access device 640 may locally verify the received access data or it may communicate with a remotely located authentication server computer (not shown). The remotely located authentication server computer may verify that the access data is authentic and may transmit a signal indicating this back to the access device 640. The access device 640 may then proceed to let the user 610 enter the building 620.

Figure 7:
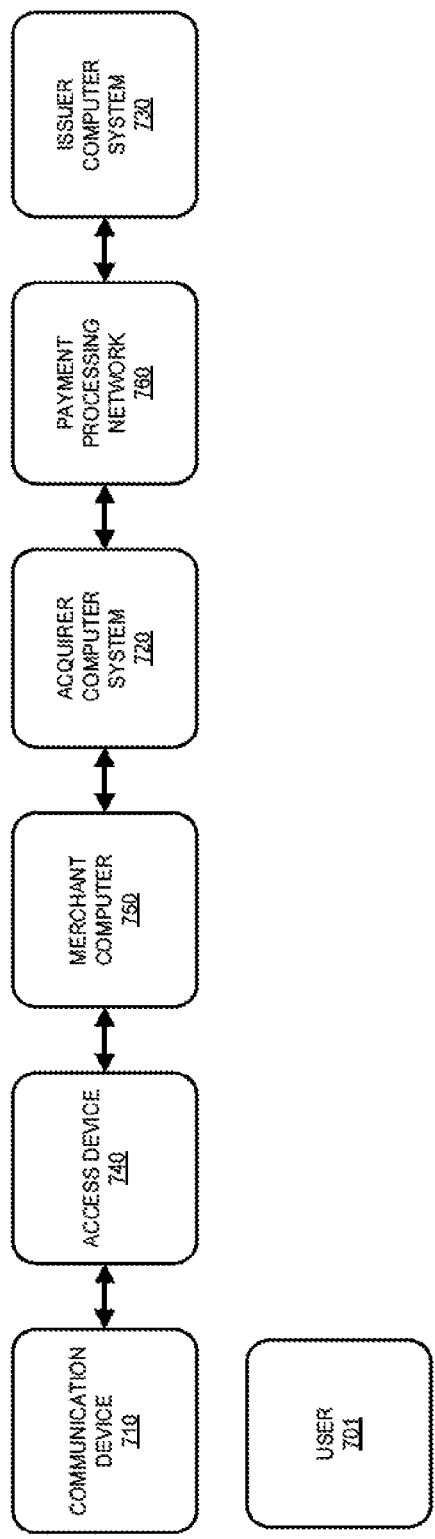
FIG. 7 illustrates a block diagram of a transaction processing system according to some embodiments of the invention.

FIG. 7 illustrates a transaction processing system that includes a communication device 710 such as a mobile device provisioned with access data to allow a user to access an account to pay for a good or service at a merchant. A user 701 that can operate a communication device 710. The user 701 may use the communication device 710 to pay for a good or service at a merchant. The merchant may operate a merchant computer 750 and/or an access device 740. The merchant may communicate with an issuer computer 730 via an acquirer computer 720 and a payment processing network 760.

The payment processing network 760 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A transaction flow using a communication device 710 at an access device 740 (e.g. POS location) can be described as follows. A user 701 presents his or her communication device 710 to an access device 740 to pay for an item or service (e.g., by launching an application provisioned with access data to initiate communication with access device 740). The communication device 710 and the access device 740 can interact such that access data from the communication device 710 (e.g. PAN, a token, verification value(s), expiration date, etc.) is received by the access device 740 (e.g. via contact or contactless interface). The merchant computer 750 may then receive this information from the access device 740 via a communication interface. The merchant computer 750 may then generate an authorization request message that includes the information received from the access device 740 (i.e. access data) along with additional transaction information (e.g. a transaction amount, merchant specific information, etc.) and electronically transmits this information to an acquirer computer 720. The acquirer computer 720 may then receive, process, and forward the authorization request message to a payment processing network 760 for authorization.

Prior to the occurrence of a credit or debit-card transaction, the payment processing network 760 may have an established protocol with each issuer on how the issuer's transactions are to be authorized. In some cases, such as when the transaction amount is below a threshold value, the payment processing network 760 may be configured to authorize the transaction based on information that it has about the user's account without generating and transmitting an authorization request message to the issuer computer 730. In other cases, such as when the transaction amount is above a threshold value, the payment processing network 760 may receive the authorization request message, determine the issuer associated with the access data provided by communication device 710, and forward the authorization request message for the transaction to the issuer computer 730 for verification and authorization. Once the transaction is authorized, the issuer computer 730 may generate an authorization response message (that may include an authorization code indicating the transaction is approved or declined) and transmit this electronic message via its communication interface to payment processing network 760. The payment processing network 760 may then forward the authorization response message to the acquirer computer 720, which in turn may then transmit the electronic message to comprising the authorization indication to the merchant computer 750, and then to the access device 740.

At the end of the day or at some other suitable time interval, a clearing and settlement process between the merchant computer 750, the acquirer computer 720, the payment processing network 760, and the issuer computer 730 may be performed on the transaction.

Figure 8:
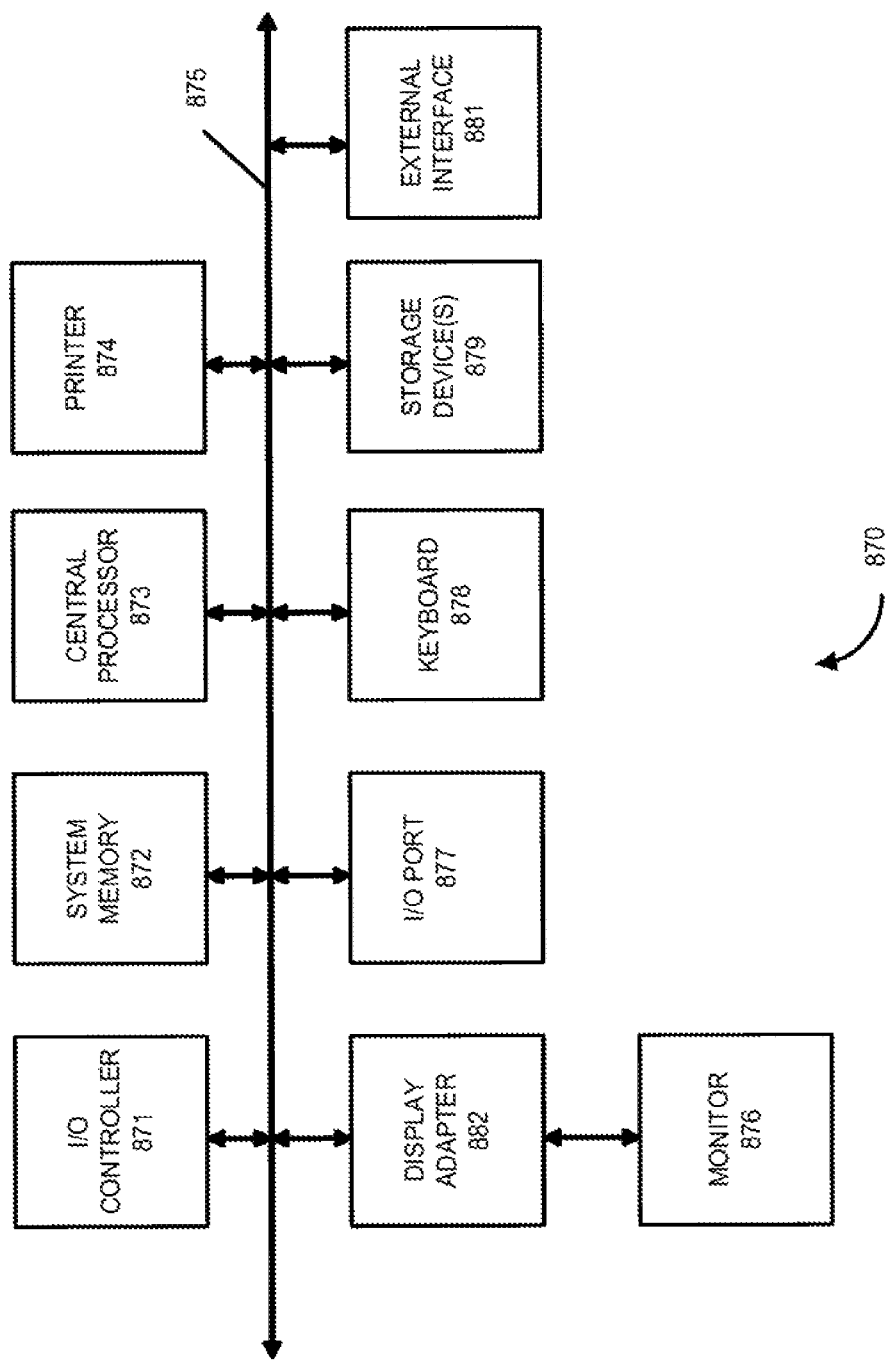
FIG. 8 illustrates a block diagram of a computing system according to some embodiments of the invention.

FIG. 8 is a high level block diagram of a computer system that may be used to implement any of the entities or components described above. The subsystems shown in FIG. 8 are interconnected via a system bus 875. Additional subsystems include a printer 874, keyboard 878, system memory 872, and monitor 876, which is coupled to display adapter 882. Peripherals and input/output (I/O) devices, which couple to I/O controller 871. For example, the external interface 822 can be used to connect the computer apparatus to a wide area network such as the Internet, a mouse input device, or a scanner, via an input/output port 877. The interconnection via system bus 875 allows the central processor 873 to communicate with each subsystem and to control the execution of instructions from system memory 872 or the storage device(s) 879, as well as the exchange of information between subsystems. The system memory 872 and/or the storage device(s) may be embodied by a computer-readable medium.

Embodiments of the invention have a number of advantages. For example, as noted above, in embodiments of the invention, a second application (which can be an untrusted application) may be provisioned with access data by making the request for the access data using a trusted first application associated with an authorizing entity (e.g., remote server computer associated with an issuer of an account). The authorizing entity can be confident that the request for the access data is authentic since the application is a trusted application. Also, the use of the above-described techniques allow for an improved user experience since a step-up authentication step may be bypassed when provisioning the access data for use with the second application. The provisioning process may also include providing a device identifier to the authorizing entity when requesting the access data. In this manner, the access data can be bound to the communication device, and cannot be used with a different device.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the invention, and that this invention is not to be limited to the specific arrangements and constructions shown and described, since various other modifications may occur to those with ordinary skill in the art.

It should be understood that the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It should also be understood that one or more features from any embodiment may be combined with one or more features of any other embodiment without departing from the scope of the invention.

As used herein, the use of "a", "an" or "the" is intended to mean "at least one", unless specifically indicated to the contrary.

What is claimed is:

1. A method comprising:
   receiving, by a server computer from a first application via a second application on a mobile device, encrypted provisioning request data including an account ID of an account to provision, a user ID associated with the second application, and a device ID in encrypted form, wherein the first application received user input selecting the account to provision to the second application, the user ID associated with the second application from the second application, and the device ID from the second application, and generated the encrypted provisioning request data;
   decrypting, by the server computer, the received provisioning request data using a key associated with the first application to determine that the encrypted provisioning request data was generated by the first application;
   validating, by the server computer, the encrypted provisioning request data based on at least the determination that the encrypted provisioning request data was generated by the first application; and
   transmitting, by the server computer to the second application on the mobile device, access data based on validation of the encrypted provisioning request data, wherein the second application stores the access data.

2. The method of claim 1, wherein the encrypted provisioning request data further includes a timestamp, and validating the encrypted provisioning request data includes determining whether a difference between a time at which the encrypted provision request data was received by the server computer and the time indicated in the timestamp is within a predefined time threshold.

3. The method of claim 1, wherein validating the encrypted provisioning request data includes determining that the account ID is a valid account ID associated with first application.

4. The method of claim 1, wherein the access data includes user credential data that the second application uses to access a service associated with the first application.

5. The method of claim 1, wherein the first application is an issuer application and the second application is an digital wallet application.

6. The method of claim 1, wherein the access data allows a user of the mobile device to access a building.

7. The method of claim 1, wherein the access data is a token that is a substitute for the account ID.

8. The method of claim 1, wherein the method further comprises:
   receiving, an application ID of the first application, and then using the application ID to retrieve the key.

9. A server computer comprising:
   a processor; and
   a non-transitory computer readable medium, the non-transitory computer readable medium comprising code, executable by the processor, for implementing a method comprising
   receiving, from a first application via a second application on a mobile device, encrypted provisioning request data including an account ID of an account to provision, a user ID associated with the second application, and a device ID in encrypted form, wherein the first application received user input selecting the account to provision to the second application, received the user ID associated with the second application from the second application, and the device ID from the second application, and generated the encrypted provisioning request data,
   decrypting the received encrypted provisioning request data using a key associated with the first application to determine that the encrypted provisioning request data was generated by the first application,
   validating the encrypted provisioning request data based on at least the determination that the encrypted provisioning request data was generated by the first application, and
   transmitting, to the second application on the mobile device, access data based on validation of the encrypted provisioning request data, wherein the second application stores the access data.

10. The server computer of claim 9, wherein the encrypted provisioning request data further includes a timestamp, and validating the encrypted provisioning request data includes determining whether a difference between a time at which the encrypted provision request data was received by the server computer and the time indicated in the timestamp is within a predefined time threshold.

11. The server computer of claim 9, wherein validating the encrypted provisioning request data includes determining that the account ID is a valid account ID associated with first application.

12. The server computer of claim 9, wherein the access data includes user credential data that the second application uses to access a service associated with the first application.

13. The server computer of claim 9, wherein the first application is an issuer application and the second application is an digital wallet application.

14. The server computer of claim 9, wherein the access data allows a user of the mobile device to access a building.

15. The server computer of claim 9, wherein the access data is a token that is a substitute for the account ID.

16. The server computer of claim 9, wherein the method further comprises:
   receiving, an application ID of the first application, and then using the application ID to retrieve the key.

* * * * *